April 8, 1952     F. J. WARCUP     2,591,985
AUTOMATIC CLEANER SOLUTION SUPPLY
FOR BEER DISTRIBUTING SYSTEMS
Filed Nov. 24, 1947
FIG. I.
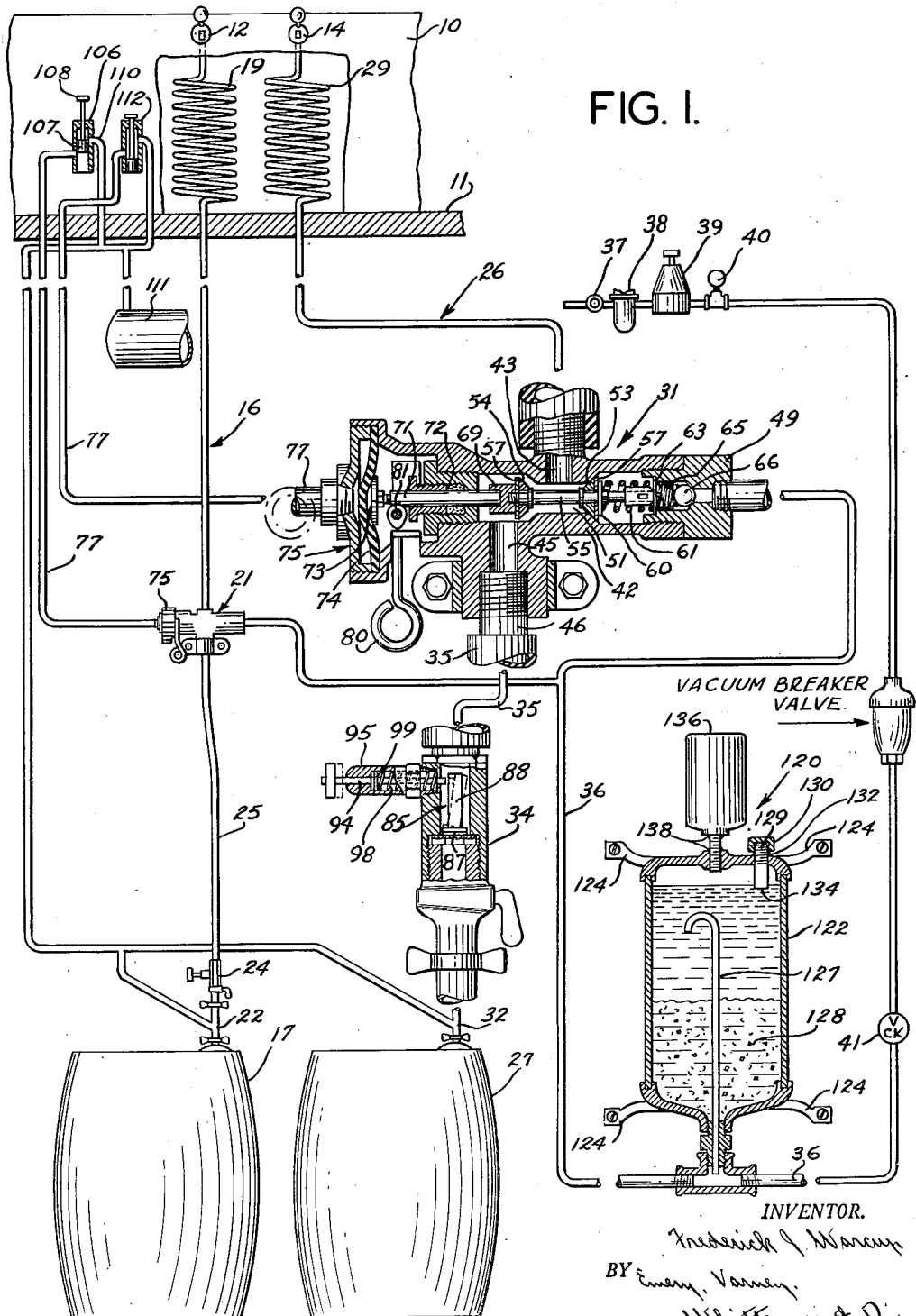
INVENTOR.
Frederick J. Warcup
BY Emery, Varney,
Whittemore & Dix
ATTORNEYS.

Patented Apr. 8, 1952

2,591,985

UNITED STATES PATENT OFFICE 2,591,985

AUTOMATIC CLEANER SOLUTION SUPPLY
FOR BEER DISTRIBUTING SYSTEMS

Frederick J. Warcup, Nyack, N. Y.

Application November 24, 1947, Serial No. 787,646

5 Claims. (Cl. 225—12)

This invention relates to apparatus for cleaning beer distributing systems with chemical cleaners, and the invention is particularly concerned with cleaning the beer line automatically.

A number of systems have been devised for admitting water into beer lines to flush the lines and brewers have urged their customers to flush lines with water every day in order to keep the lines clean and fresh so as not to change the taste of the beer. In many taverns the flushing of beer lines with clear water is not enough to keep the lines clean, but the lines can be kept clean by occasionally using a chemical cleaning solution in them, for example tri-sodium phosphate. Most taverns employ a pipe cleaner who comes in periodically to clean the beer lines. Various methods and cleaners are used, including sand, glass beads, and sponges, as well as chemical solutions.

Some of the systems for admitting water into the beer lines have made provision for injecting chemical into the lines when they are to be cleaned, but experience has shown that bartenders are careless about using such apparatus regularly, with the result that the lines do not stay clean. When the water connection system permits the bartender to fill the beer line with water after a keg goes empty and the beer from the next keg tapped is used to push the water out of the line, the bartender can be relied upon to fill the line with water between kegs because this prevents the first beer from the new keg from being wild and is, therefore, a convenience to him.

It is an object of this invention to provide an improved beer distributing system with means for cleaning it automatically with a chemical solution when water is admitted into a beer line between kegs. Some features of the invention relate to apparatus by which a charge of cleaner solution is injected into the water stream to clean the line and the water supply behind this charge is clear. This clear rinsing water removes all traces of the cleaner solution and foul air from the beer line and insures against possible contamination of the beer by any cleaner that might remain in the line and impair the flavor of the first beer drawn from the new keg.

The invention is not limited to the cleaning of lines between kegs, and it can be used for bringing cleaning solution into the lines at any time, as for example, when shutting down for the night. In the lull periods it avoids keeping of beer in the coils which causes the beer to get stale and contaminated and permits the coil to be filled with water instead. Other features of the invention relate to constructions that make possible repeated operation of the automatic injection device without attention for refilling, and that insure adequate mixing of the solution, and the compression of air for causing the automatic operation.

Other objects, features and advantages of the invention will appear or be pointed out as the description proceeds.

In the drawing, forming a part hereof, the single figure is a diagrammatic view of a beer distributing system embodying this invention.

The drawing shows a bar 10 located on the first floor 11 of a tavern and equipped with a plurality of taps 12 and 14. Only two taps are shown, but it will be understood that these are merely representative of a plurality of taps, it being common for bars to have four or six taps and sometimes more. The tap 12 is connected by a beer line 16 to a keg 17 located in the basement of the tavern. This beer line includes a cooling coil 19 enclosed by suitable refrigeration apparatus which is not illustrated since cooling coils in beer lines are conventional and well understood equipment. The line 16 includes also a master valve 21. Tapping equipment 22 is connected to the lower end of the line 16 below the master valve 21 through a fitting 24 and flexible hose or tubing 25 that comprises the lower end of the beer line.

The tap 14 is connected by a beer line 26 with a keg 27 in the basement, and this second beer line 26 includes a cooling coil 29 and master valve 31. Tapping equipment 32 is connected with flexible hose or tubing 35, comprising the lower end of the beer line 26, by a fitting 34 which is shown in section and on an enlarged scale. The fitting 24 is of similar construction. Each of the master valves 21 and 31 is preferably located close to the keg with which it is used. This proximity is best obtained by mounting the master valves on the wall of the room in which the kegs are kept. The master valves are thereby located within 3 to 6 feet of the kegs. In novelty boxes the valve can be placed on the rod or the golden gate tapping equipment.

Each of the master valves 21 and 31 is connected with a water supply line 36 which connects with the city water main through a shut-off valve 37, strainer 38, pressure regulator 39, gauge 40 and check valve 41. The purpose of the master valves 21 and 31 is to selectively connect their respective beer lines 16 and 26 with either the kegs 17 and 27 respectively, or the water supply line 36.

The valve 31 is shown in the drawing on an enlarged scale and in section to illustrate its interior construction. The other master supply valve 21 is of identical construction. Each of these master valves 21 and 31 comprises a valve casing 42 having a central outlet port 43 communicating with the upper part of the beer line 26 leading to the bar. The valve casing 42 has a lower port 45 connected by a nipple 46 with the flexible tubing 35 that comprises the lower portion of the beer line between the master valve 31 and the keg 27.

The water supply line 36 communicates with the interior of the valve casing 42 through a check valve 49 screwed into one end of the valve casing. The central port 43 communicates directly with a chamber 51, and there are valve seats at opposite ends of this chamber 51 for valve elements 53 and 54. These valve elements are attached to a valve stem 55 and include washers held against shoulders on the valve stem 55 by retainers 57.

The valve stem 55 is so correlated with the length of the chamber 51 between the valve seats that only one of the valve elements 53 and 54 can be in contact with its seat at any particular time. The valve element 53 is held in place by a cap 60 on the far end of the valve stem; and this valve element 53 has a strong bias toward the closed position as a result of the pressure of a spring 61 compressed between the cap 60 and a strainer 63 located in a counterbore at the inner end of the check valve 49. A similar but lighter spring 65 on the other side of the strainer 63, holds a ball valve element 66 of the check valve 49 closed against the check valve seat at all times except when water is flowing into the master valve from the water supply line 36.

The valve element 54 is held in place on the valve stem 55 by a connector 69 threaded over the end of the valve stem. At the outer end of the connector 69 there is a socket for receiving one end of a push rod 71. The push rod extends through a stuffing box 72 and connects with a head 73 which contacts with one side of an imperforate diaphragm 74. The head 73 and push rod 71 are threaded together; and the total length of the combined head and push rod can be adjusted by screwing them one way or the other with respect to one another.

This diaphragm 74 is the working part of a servomotor 75 and is operated by air or other fluid supplied to the space in front of the diaphragm 74 through tubing 77.

Whenever compressed air is supplied to the servomotor 75 under sufficient pressure, the diaphragm 74 displaces the push rod 71 and shifts the valve element 54 into closed position against the pressure of the spring 61. The valve element 53 is moved into open position.

Whenever the valve elements 53 and 54 are in their normal positions, as shown in the drawing, the beer line 26 is in direct communication with the keg 27 through the chamber 51 of the valve casing. When working fluid is supplied to the servo-motor 75 to push the valve element 54 into closed position, and the valve 53 into open position, the portion of the beer line 16 above the master valve is in communication with the water supply line 36; and if the tap on the bar is opened, water from the supply line 36 flows past the check valve element 66 around the open valve element 53 and through the central port 43 to the beer line 26.

The water pressure forces the beer in the line 26 out through the open tap until all of the beer in the line 16 has run out. The water then flows from the tap and this is a signal to the bartender that the beer line above the master valve contains only water. Each beer line is preferably left in this condition when the tavern is shut down for the night so that there can be no yeast growth or contamination of beer such as results from having beer standing in the lies overnight. The water supply line through which water flows to the master valve to displace beer from the line 16 is a part of the "beer distributing system" for purposes of this invention.

The water pressure is preferably adjusted to a value equal to the beer pressure, but the invention can be used with water pressure somewhat higher or lower than the beer pressure.

The hose or flexible tubing 35 remains full of beer when the valve elements 53 and 54 are shifted into position to supply water to the beer line 26 above the master valve, but this is not objectionable in systems because the beer kegs are kept in a refrigerated compartment in the basement, and the distributing apparatus of this invention preferably locates the master valves in the refrigerated compartment so that the hose connection 25 is always at a low temperature and therefore not subject to rapid yeast growth. When the kegs are not kept in a refrigerated compartment, the master valve can be located on the tapping equipment. This eliminates the beer in the hose between the master valve and keg when the beer line is filled with water.

Even though the hose 35 is refrigerated, however, it is desirable that this hose, and the beer rod of the tapping equipment 32 should be washed out at fairly frequent intervals, and this can be done every time a new keg is tapped. After the keg 27 becomes empty, for example, water can be run through the hose 35, fitting 34 and the tapping equipment 32 by operating the servo-motor 75 to move the valve element 53 into open position, and then operating a valve actuator comprising a handle 80 and cam 81. This cam 81 turns as a unit with the handle 80 and when the diaphragm 74 and head 73 are displaced toward the right, rotation of the cam causes it to contact with the head 73 and displace the head and the diaphragm 74, against the pressure of the working fluid in the servomotor 75, just far enough to cause both of the valve elements 53 and 54 to stand one-half way open at the same time. The water from the supply line 36 can then flow past the valve element 53, through the chamber 51, past the valve element 54 and down through the outlet 45 to the hose 35.

Within the fitting 34 there is a check valve element 85. This valve element 85 closes against a valve seat 87 and has a central stem 88 extending upward. A push rod 94 slides in a housing 95 attached to the side of the fitting 34. When the push rod 94 is thrust toward the right, the rod 94 strikes against the stem 88 and with further displacement of the push rod 94, the valve element 85 is partially upset so that water from above can pass the check valve and flow downward into the tapping equipment 32. A coil spring 98 is located in the housing 95 and is compressed between one end of the housing and a flange or pin 99 secured to the push rod 94.

The purpose of the check valve 85 is to prevent possible leakage of water into the beer keg 17 in the event that the valve element 53 leaks when in closed position. Since the water pressure may be higher than the beer pressure it would be possible for water to flow into the keg unless prevented from doing so by the valves.

The check valve element 66 at the end of the water supply line 36 prevents beer from being forced back into the water line 36 in the event that the beer pressure in any of the kegs accidentally becomes higher than the water pressure and the valve element 53 does not close tightly enough to withstand the beer pressure.

The tubing 77 from the master valve 21 leads up to a valve casing 106 located on the bar. This valve casing contains a piston valve 107 operated by a knob 108 attached to one end of a valve stem outside of the casing 106.

With the piston valve 107 in the position shown, the tubing 77 is open to the atmosphere through the open end at the bottom of the valve casing 106. An air line 110 connects the upper portion of the valve casing 106 with a storage tank 111. This tank may contain compressed air or carbon dioxide, and is preferably used also to maintain a gas pressure on the beer in the kegs 17 and 27.

When the valve element 107 is pushed downward beyond the port through which the tubing 77 communicates with the valve casing 106, compressed gas from the tank 111 is supplied from the line 110 through the valve casing 106 and tubing 77 to the servo-motor 75 of the master valve 21. Another control device 112, mounted on the bar, controls the operation of the servo-motor of the master valve 31. This control device 110 is similar to the control device for supplying compressed air to the servo-motor 75 of valve 21 and is shown in position to maintain gas pressure on the servo-motor 75 of the master valve 31.

The control valve 106 is in the "beer" position, that is, the master valve 21 is in position to connect the beer line with the keg 17 when the control valve is in the position shown. The control valve 112 is shown in the "Water" position, that is, the position that maintains air pressure on the servomotor 75 of master valve 31 to keep that valve open to the water supply line.

When the control valve 112 is shifted into its "Beer" position to permit exhaust of the compressed air from the servomotor 75, the air exhausts through the housing of the control valve 112 with a hiss that serves as a signal that the control valve has been operated far enough to permit the master valve to return to its "Beer" position. This signal for indicating the return of the master valve to its normal position is a feature of the invention, but signals other than the air hiss can be used if desired.

Even with beer lines that are filled with water overnight, and frequently washed out with clear water, it is desirable to clean the lines from time to time with a chemical cleaning medium. With this invention chemical cleaner from a chemical discharge device 120 is introduced into the water supply line 36 whenever a beer line is to be cleaned with chemical. The discharge device includes a tank 122 made from a tubular body portion to which upper and lower cast ends are soldered or otherwise connected to make liquid-tight and gas-tight seams. Brackets 124 extending rearwardly from the cast ends of the tank are used to attach the tank to the wall.

The water supply line 36 communicates with the interior of the tank 120, at an intermediate level between the upper and lower ends of the tank, through tubing 127. This tubing 127 opens into the water supply line 36 through a T fitting, and the upper end of the tubing 127 is preferably turned downward so that water flowing into the tank 122 through the tubing 127 is directed downward into a granulated mass of soluble cleaner material 128, such as crystals of tri-sodium phosphate. Some of the cleaner material dissolves in the water to produce a substantially saturated solution which provides a concentrate for injection into the stream of water that passes through the water supply line 36. The tank 122 is filled with crystals or other granular particles, of the solid but soluble cleaner material 128, through a filler inlet 129 that is closed by a cap 130. The filler inlet is secured in place by solder 132 to prevent the escape of air from the tank 122, and there is a lip 134 at the lower end of the filler inlet 129, preferably some distance below the top of the tank 122.

The chemical injection device 120 includes means for automatically injecting some of the cleaner solution or concentrate into the water supply line. In the construction illustrated, the automatic means comprises an air chamber above the water level in the tank 122 coordinated with the size and flow resistance of the tubing 127 so as to inject a desired amount of concentrate into the water line 36 over a limited period of time. The rate of discharge of the concentrate into the water stream varies automatically with the velocity of the water stream and this is advantageous as a control on the concentration of the solution that flows into and through the beer lines.

The air chamber of the discharge device 120 includes the air space in the tank 122 above the lip 134 of the filler inlet 129, and includes also the space inside of a surge tank 136 and a nipple 137 by which the tank 136 is connected with the tank 122. Solder 138 or other sealing means around the nipple 137 prevents the escape of air. Although air can be trapped in the tank 122 below the lip 134 when the cap 130 is closed tightly, the air chamber is more properly considered to include the upper spaces of the device that are permanently sealed when in use. The cap 130 is removed whenever new granules of cleaner material 128 are to be added to the tank 122 and it is not practical to rely upon having this cap screwed down tight after each refilling of the tank 122 with granules of cleaner. The level to which the tank 122 should be filled with the solid particles is approximately half way to the level of the open end at the top of the tubing 127. This level is limited to prevent solid particles from entering the tubing 127.

When no water is flowing from the water supply line 36 into either of the master valves 21 and 31, the water pressure in the line 36 is equal to the discharge pressure of the regulator 39, and water enters the tank 122 through the tubing 127 until the air above the water is compressed to a pressure equal to that of the water. The water may rise to a level up in the tank 136 when the air is fully compressed.

When the master valve 31 is open to admit water into the beer line, and the faucet 14 is opened to permit a flow of liquid from the beer line, the liquid pressure in the beer line drops and the pressure of the water in the supply line 36 drops. The extent of the pressure drop depends upon how wide the faucet is opened, upon the resistance to liquid flow in the beer line, master valve, and water line, and upon the height of the faucet 14 above the water supply line.

As soon as the water begins to flow at the pressure below the static pressure of the previously shut-off water line, the air compressed in the air space above the liquid in the tank 122 expands and forces the cleaner concentrate out of the tank 122, and through tubing 127 into the water stream in the supply line 36 until the pressure of the air equals the pressure of the water in the supply line 36.

The rate of flow of the water past the tank 122 is proportional to the pressure drop in the supply line 36, and since the rate of discharge of liquid from the tank 122 through the tubing 127 is dependent upon the difference between the air pressure at the top of the tank and the water pressure in the supply line 36, it follows that the rate at which cleaner concentrate is discharged into the water stream is proportional to the rate at which water is flowing to the master valve and beer line. This provides an automatic control for the average concentration of the cleaner solution formed by the mixing of the concentrate from the tank 122 and the water in the supply line 36.

The quantity of cleaner concentrate that is discharged into the water stream depends upon the volume of air compressed and upon the pressure drop in the supply line 36 in response to opening of the beer faucet on the bar. The charge of concentrate from the chemical discharge device 120 can be increased by substituting a larger tank for the tank 136. It will be understood that the height of the tank 122 can be increased and the lip 134 can be located further from the top in order to get the entire air chamber within the tank 122. The upper tank 136 is then unnecessary. Conversely the lip 134 can be at the surface of the inside face of the upper casting of the tank 122, in which case all of the air chamber is in the upper tank 136.

The length of time that the chemical discharge device 120 continues to inject cleaner concentrate into the water stream, with any given drop in the water pressure, depends partly upon the volume of air compressed and partly upon the resistance to flow offered by the tubing 127. The time of discharge can be reduced by using tubing 127 of larger diameter. The time can be reduced by using tubing of smaller diameter or by placing a constriction at one end of the tubing.

When the chemical discharge device 120 injects a charge of chemical into the water stream flowing to a beer faucet on the bar, and the beer faucet is allowed to remain open beyond the time of injection of the chemical charge, clear water from the supply line follows the cleaning solution and rinses the line. In order that the bartender may know how long to leave the faucet open, the preferred method of this invention is to mix a dye with the cleaning material 128. Red has proved to be an effective and popular color for the purpose.

When red concentrate is discharged into the water stream the solution formed has a pinkish color and the bartender watches the flow from the beer faucet until there is no further color in the stream. This informs him that all of the cleaning solution has been pushed out of the beer line by clear water behind it, and it is usual to allow the clear water to run for a few minutes as an insurance against having any possible cleaning solution remain in the line where it could affect the taste of the beer.

If no dye is used in the cleaning solution, the bartender can tell by the feel of the water stream, whether a strong cleaning solution is flowing from the faucet, when trisodium phosphate is used as the cleaning agent. The solution has a slippery feel between the fingers. As the concentration of the cleaning solution tapers off toward the end of the injection period, it is no longer possible to detect the cleaner by the feel of the stream, but the bartender can tell by taste. The color, however, gives a quicker and a more convenient indication. The expression "clear water" is used herein to mean water that is suitable for drinking and that contains no cleaner, or at least not enough to be detectable by taste.

Whenever the beer faucet is closed, the pressure in the water supply line 36 will build up to the full discharge pressure of the regulator 39 and this causes flow of water through the tubing 127 until the chemical discharge device is again filled with liquid and compressed air under a pressure equal to that of the water. With some installations a small chemical discharge device is used, and the beer line is completely filled with cleaning solution by alternately opening and closing the beer faucet, the open periods being not longer than the time required for the chemical discharge device to inject a charge of concentrate into the water stream. A discharge device capable of injecting cleaner concentrate into the water stream for only eight seconds at each operation can be made to fill a beer line that takes thirty seconds to fill by opening and closing the faucet four times. These figures are given merely by way of example.

Various changes and modifications can be made in the invention, and some features can be used alone or in different combinations without departing from the invention as defined in the claims.

I claim as my invention:

1. A beer distributing system including a beer line leading to a faucet, a water supply line, a master valve operable in different positions to connect the beer line selectively with the water supply line or a keg, operator-actuated control mechanism for shifting the position of the master valve, a tank for holding a charge of soluble cleaning material, a conduit through which the water supply line communicates with the tank at a level intermediate the upper and lower ends of the tank, an air chamber above the level at which said conduit opens into the tank, said air chamber being sealed at the top and being constructed and arranged to receive air compressed by the rising of water into the tank when the faucet is closed and water pressure is high in the water supply line, and said air chamber serving as a source of pressure for forcing cleaner concentrate out of the tank and into the water supply line when the pressure in the water supply line drops in response to opening of the faucet.

2. Automatic cleaning apparatus for a beer line, said apparatus comprising a water supply line that can be put into communication with a beer line leading to a faucet, a tank for holding a supply of solid but soluble cleaner material, a tubing communicating with the water supply line and opening into the tank at a region above the highest intended level of the solid cleaner material, an inlet conduit at the upper portion of the tank and through which fresh supplies of solid cleaner material are put into the tank when necessary, said inlet having a lower edge and a cover for closing the inlet, and an air chamber in the tank above the level of the lower edge of the inlet so that compressed air trapped in the air chamber of the tank cannot escape past a loosely fitting cover for the inlet.

3. A beer distributing system including a beer line, a water supply line, a master valve operable into different positions for connecting the beer line selectively with a keg or with the water supply line, a faucet at the upper end of the beer line for dispensing beer at a bar, a chemical injection device in communication with the water supply line near the master valve, said chemical injection device comprising a tank for holding granular particles of soluble cleaner material, a filler opening through which granular cleaning material can be poured into the tank for replenishing that which has been used, an air chamber above the lower edge of the filler opening and into which air is compressed when water is supplied into the tank from the water supply line, tubing leading from the water supply line to an intermediate level of the tank above the intended level of the granular cleaning material, said tubing constituting the only communication between the interior of the tank and the water supply line, and said tubing having a U-shaped upper end by which water entering the tank is discharged downwardly into the granular cleaning material in the lower portion of the tank, a water regulator in the water supply line upstream from the chemical discharge device, said regulator being adjustable to change the water pressure and thereby change the compression of the air in the chemical discharge device, a servo-motor on the master valve for controlling the movement of the master valve between its different positions, and remote control means adjacent the valve for operating the servo-motor.

4. A beer distributing system including a beer line, tapping apparatus for connecting the beer line with a keg, a water supply line, master valve means operable into different positions for selectively connecting and disconnecting the beer line and water supply line, a beer faucet for controlling passage of liquid from said master valve means upward through the beer line, other valve means for controlling passage of liquid from said master valve means downward through the trapping apparatus, a chemical discharge device in communication with the water supply line, and a compressed gas chamber in said discharge device for forcing chemical into the water supply line when either the faucet or said other valve means are operated to draw water through the master valve.

5. A beer distributing system including in combination a beer line for connecting a keg to a faucet on a bar, valve means in the beer line for connecting the beer line with a water supply line, said valve means including a valve element that closes in the direction of water flow into the beer line, a check valve that closes against the direction of water flow to the beer line and that is located adjacent said valve element, a spring urging the valve element toward closed position, a spring of different strength urging the check valve toward closed position, and a common perforate partition separating the springs and against which both of the springs react.

FREDERICK J. WARCUP.

REFERENCES CITED

The following references are of record in the file of this patent:

UNITED STATES PATENTS

| Number | Name | Date |
|---|---|---|
| 451,344 | Taylor | Apr. 28, 1891 |
| 841,722 | Schlichting | Jan. 22, 1907 |
| 877,043 | Bowers | Jan. 21, 1908 |
| 1,129,598 | Peroutek | Feb. 23, 1915 |
| 1,582,974 | Barbaring | May 4, 1926 |
| 1,691,171 | Twichell et al. | Nov. 13, 1928 |
| 2,066,397 | Fogarty | Jan. 5, 1937 |
| 2,128,721 | Watts | Aug. 30, 1938 |
| 2,189,448 | McCrory | Feb. 6, 1940 |
| 2,443,550 | Zwosta | June 15, 1948 |